[11] 3,572,878

[72] Inventor Sun Lu
Dallas, Tex.
[21] Appl. No. 666,584
[22] Filed Sept. 11, 1967
[45] Patented Mar. 30, 1971
[73] Assignee Texas Instruments Incorporated
Dallas, Tex.

[54] COMPLEX SPATIAL FILTER SYNTHESIS
6 Claims, 5 Drawing Figs.
[52] U.S. Cl. ........................................ 350/3.5,
350/162
[51] Int. Cl. .................................... G02b 27/22
[50] Field of Search ............................. 350/3.5,
162; 346/1

[56] References Cited
UNITED STATES PATENTS
3,427,629 2/1969 Jacobs et al. ................ 346/1
3,435,244 3/1969 Burckhardt et al. .......... 350/162X OTHER REFERENCES
Cutrona et al; IRE TRANSACTIONS ON INFORMATION THEORY, 386—400 (6/1960)

*Primary Examiner*—David Schonberg
*Assistant Examiner*—Robert L. Sherman
*Attorneys*—Samuel M. Mims, Jr., James O. Dixon, Andrew M. Hassell, Harold Levine, Robert J. Crawford, Richards, Harris and Hubbard, V. Bryan Medlock, Jr. and Harold E. Meier ABSTRACT: An optical filter in the form of a synthetic hologram of an aggregation of point sources recorded on a photographic plate using a standard two-beam holographic system. The required filter function of the optical filter is established and generalized into a periodic function which is then synthesized by a finite number of harmonics in a spatial frequency domain. Where the filter function has a degree of symmetry, the synthesis process is comparatively simple with only the first several harmonics needed to construct the optical filter. Both the amplitude and phase of the desired function are recorded on the synthetically generated hologram.

PATENTED MAR 30 1971

3,572,878

INVENTOR

SUN LU

Harold E. Meier

ATTORNEY

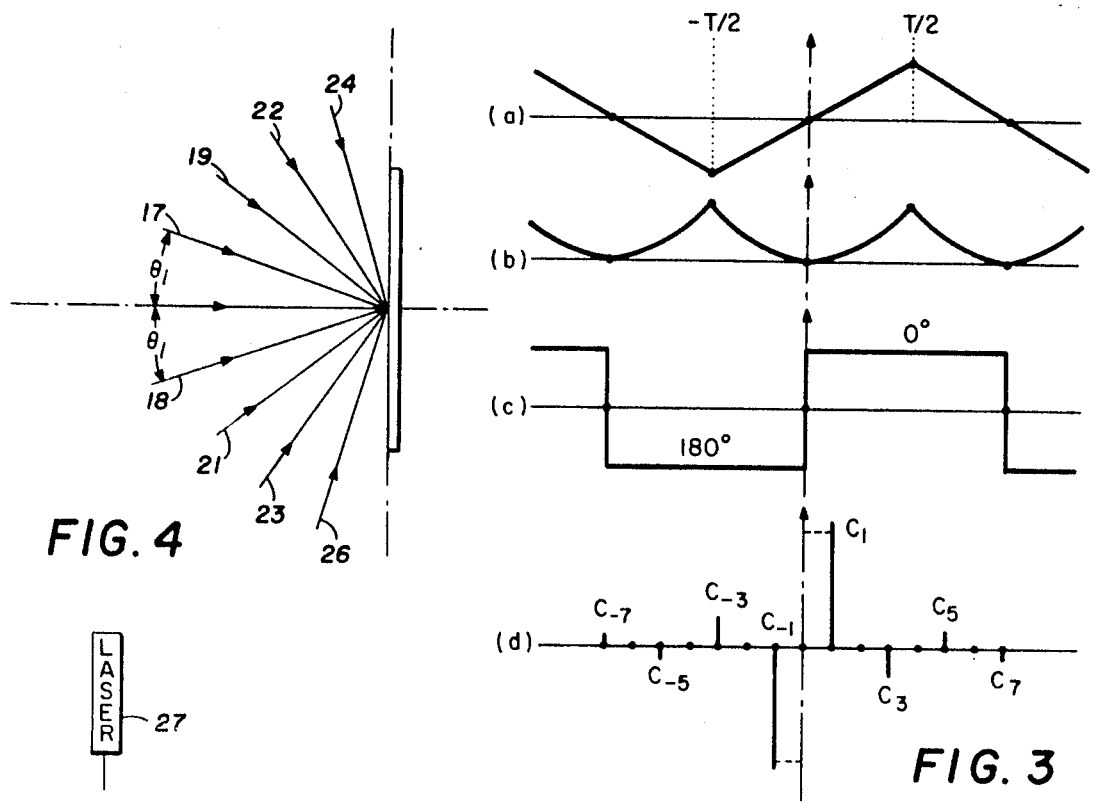
FIG. 4
FIG. 3
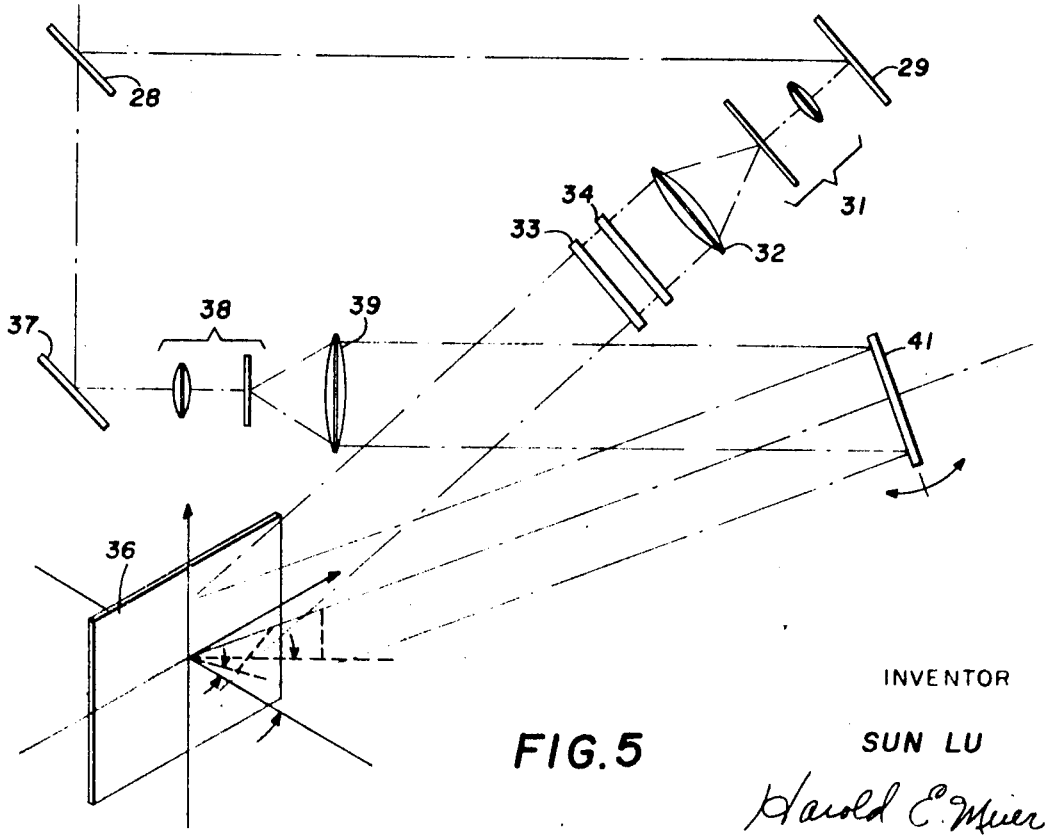
FIG. 5
INVENTOR
SUN LU
*Harold E. Meier*
ATTORNEY

COMPLEX SPATIAL FILTER SYNTHESIS

This invention relates to an optical spatial filter, and more particularly to a complex spatial filter the filter function of which is synthesized by a synthetic hologram of a plurality of plane wave fronts.

An optical filter synthesized in accordance with this invention finds application in those situations where it is necessary to correct distorted images that have been recorded using an imperfect imaging system. An imperfect imaging system will often produce a photographic transparency that does not contain a clear and sharp reproduction of a given object. A distorted recording of an object may also be the result of the particular conditions under which the recording was generated.

In an attempt to clarify distorted images a number of complex systems have been devised. For example, in one system the distorted image is converted into electrical signals by an optical scanning system. The distorted image is also scanned with an electron beam in much the same way as an electron beam is made to scan the face of the cathode-ray tube in a television receiver. The scanning signals are fed into the computer which filters the distorted image signal to remove unwanted distortions. Needless to say, such a system is complicated and expensive. Another method is to use a lens ground in such a manner that it produces the desired filtering function. Although this system is reliable and relatively inexpensive, it is more often than not very difficult to grind a lens to produce the desired filtering. Usually, a compromise must be accepted which may or may not be adequate.

In accordance with the present invention, the desired filter function is reduced to a periodic mathematical function. The periodic function is then synthesized by a finite number of harmonics, the number of harmonics depending on the desired degree of accuracy required. A hologram is generated to record all the harmonics by interfering a movable object plane wave with a fixed reference plane wave or vice versa. Each interference pattern produces a wave in the reconstruction process having a fixed amplitude and phase which corresponds to the amplitude and phase of each harmonic in the periodic function. To produce the desired wave from each interference pattern, a predetermined relationship exists for the angle between the two interfering beams, the intensity of the object wave recorded, and the phase relationship between the two beams.

In one embodiment of the invention, a complex spatial filter was synthesized by generating a hologram using a helium-neon laser for both the object and reference beams. The angle the object wave makes with the normal to the hologram is varied along with the relative phase angle between the object and reference wave to produce the desired phase relationship in the reconstructed wave. The amplitude of the reconstructed wave is controlled by varying the exposure time for each interfering pattern.

The present invention provides a system for producing a complex spatial filter in the form of a synthetic hologram. In accordance with the present invention, a plurality of interference patterns between two plane waves are recorded on an energy sensitive surface in a time sequence. Each interference pattern represents a harmonic in the filter function. The angle of incidence one of said plane waves makes with the hologram generates the correct hormonic and the exposure time for each pattern is selected to produce the desired harmonic amplitude. The phase angle between the two plane waves is controlled to give each harmonic the correct phase angle.

A more complete understanding of the invention and its advantages will be apparent from the specification and claims and from the accompanying drawings illustrative of the invention.

Referring to the drawings:

FIG. 3 is a plot of a filter function along with the intensity, phase, and angle of incidence of the harmonics to synthesize the filter function;

FIG. 4 shows the angle of incidence the object wave makes with the normal to the hologram for each harmonic shown in FIG. 3; and FIG. 5 is a schematic of a system for generating a Fourier transform synthetic hologram for filter synthesis.

Figure 1:
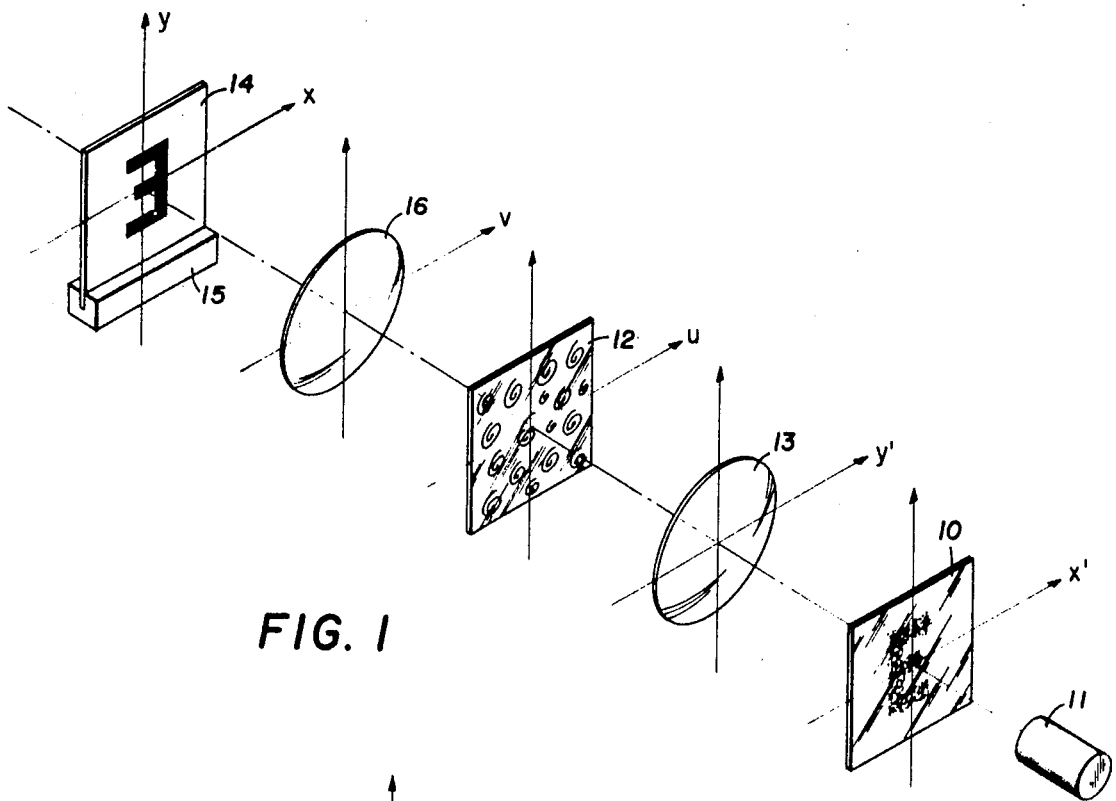
FIG. 1 is a diagrammatic of a system for producing a clear image from a distorted master image.

Referring to FIG. 1, there is shown a system for producing clear images from a distorted master image. The distorted master image 10 is illuminated from a source of monochromatic light 11, for example, a helium-neon laser. Light waves from the source 11 passing through the master image 10 produce a diffraction pattern; the Fourier transform of this pattern is established at a hologram 12 by means of a convex lens 13. The complex light pattern from the master image 10 passes through the hologram 12 thereby producing another complex diffraction pattern; the Fourier transform of this second pattern is established at an imaging surface 14, supported in a holder 15, by means of a convex lens 16.

With the relatively simple system shown in FIG. 1, a clear image is produced on the surface 14 by means of the spatial filtering properties of the hologram 12. The focal length of the convex lenses 13 and 16 determines the spacing between the various elements. For example, the distance between the master image 10 and the convex lens 13, and the distance between the hologram 12 and the convex lens 13, is determined by the focal length of the convex lens 13. Similarly, the distance between the hologram 12 and the convex lens 16, and the surface 14 and the convex lens 16 is determined by the focal length of the convex lens 16. However, the tolerances on the distances between the various elements are not critical.

In operation, consider that the master image 10 has a complex wave transmission function equal to $f(x',y')$, and that the master image is located on the focal plane $x'y'$ of the convex lens 13. If the hologram 12 is also located on a focal plane of the convex lens 13, identified as plane $uv$, then the lens 13 establishes the Fourier transform of the function $f(x',y')$ on the $uv$ plane. From well-known diffraction and Fourier transform theory, the complex wave on the hologram will be:

$$F(u, v) = F\ (f[x', y'])$$
$$= \int_{-\infty}^{\infty}\int f(x', y') e^{-i\frac{2\pi(ux'+vy')}{f_1\lambda}} dx'dy' \quad (1)$$

where $f_1$ is the focal length of the lens 13 and $\lambda$ is the wavelength of the light from the source 11. If the hologram 12, located in the $uv$ plane, has a transmission function $G(u,v)$, then the complex wave function passing through the hologram is equal to the product of $F(u,v) \times G(u,v)$. Since the $uv$ plane is also a focal plane of the convex lens 16, the Fourier transform of the product of $F(u,v) \times G(u,v)$ will be established on the surface 14. The plane of the surface 14 is identified as being the $xy$ plane and is at a focal point of the convex lens 16. In mathematical terms, the light distribution on the $xy$ plane is given by the equation:

$$h(x, y) = \int_{-\infty}^{\infty}\int F(u, v) G(u, v) e^{-i\frac{2\pi(ux+vy)}{f_2\lambda}} dudv \quad (2)$$

where $f_2$ is the focal length of the convex lens 16. According to the convolution theorem for Fourier transformation, the light distribution on the $xy$ plane is given by the equation:

$$h(x, y) = \left[\int_{-\infty}^{\infty}\int F(u, v) e^{-i\frac{2\pi(ux+vy)}{f_2\lambda}} dudv\right]^*$$
$$\left[\int_{\infty}^{\infty} \int G(u, v) e^{-i\frac{2\pi(ux+vy)}{f_2\lambda}} dudv\right] \quad (3)$$

where the "*" is the convolution integral. The first integral in the equation (3) is the mathematical representation of the pattern on the master image 10 modified by magnification factor $f_2/f_1$:

$$f(mx, my) = \int_{-\infty}^{\infty}\int F(u, v) e^{-i\frac{2\pi(ux+vy)}{f_2\lambda}} dudv \quad (4)$$

where $m=f_2/f_1$, the magnification factor. Now if the function $g(x,y)$ is chosen to represent the Fourier transformation of $G(u,v)$ then:

$$g(x, y) = \int_{-\infty}^{\infty}\int G(u, v)e^{-i\frac{2\pi}{f_2\lambda}(ux+vy)} du\,dv \quad (5)$$

and equation (3) can be written as:

$$h(x,y) = f(mx,my) * g(x,y) \quad (6)$$

By properly selecting a $g(x,y)$ function (or its equivalent, a $G(u,v)$ function), it is possible to produce a $h(x,y)$ pattern which preserves only the desired information in the input $f(x', y')$.

Thus, to create a clear image on the surface 14 from the distorted image on the master 10, it is necessary to produce a hologram 12 having a transmission function $G(u,v)$. It is well known that a hologram can record a plurality of object waves in a time sequence such that the reconstructed wave front is the coherent addition of all the object wave fronts. Assume that the reconstructed wave front is given by the mathematical equation:

$$O(x) = \sum_{k=1}^{n} (t_k e^{i\alpha_k}) A_k(x) e^{i\phi_k(x)} \quad (7)$$

where $A_k(x)e^{i\phi_k(x)}$ = the amplitude of the $k$th object wave,
$t_k$ = exposure time for the $k$th object wave, and
$\alpha_k$ = phase angle of the $k$th object wave.

Equation (7) can be simplified and rewritten as follows:

$$O(x) = \sum_{k=1}^{n} C_k A_k(x) e^{i\phi_k(x)} \quad (8)$$

where $C_k = t_k e^{i\phi_k}$ = a complex constant.

Since the complex spatial filter on the hologram 12 has a finite dimension determined by the size of the hologram, then the actual filter function is described by the equation:

$$Q(x) = A(x)e^{i\phi(x)} \quad (9)$$

for $-T/2 \le x \le T/2$ if the hologram 12 has the dimensions $-T/2$ to $T/2$, and $$Q(x) = 0 \text{ elsewhere.}$$

Thus, the area outside the region $x \le T/2$ is of no concern in obtaining the desired filtering operation, and the above filter function can be represented by a hypothetical filter having a function given by the equation:

$$W(x) = Q(x) = A(x)e^{i\phi(x)} \quad (10)$$

for $-T/2$ to $T/2$. Outside this region the function $W(x)$ assumes similar values for each period $T$.

Figure 2:
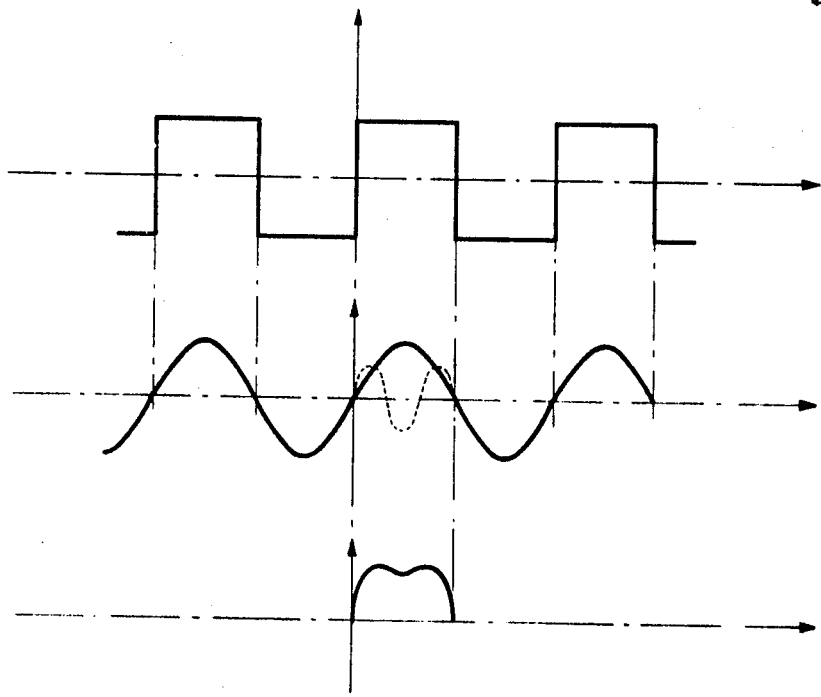
FIG. 2 is a representation of a square wave electrical signal and the fundamental and third harmonic which are contained within the square wave.

Since the function $W(x)$ is periodic, it can be expanded into a Fourier series in a manner analogous to an expansion of a periodic electrical energy wave, such as shown in FIG. 2. The square wave in the upper portion of FIG. 2 includes the fundamental frequency and all odd harmonics. In the center of FIG. 2 there is shown the fundamental and third harmonic which when combined produce a square wave, as shown in the lower section of FIG. 2, that approaches a square wave configuration. As is well known to those skilled in electrical engineering theory, the accuracy of the reproduction of a square wave is dependent upon the number of harmonics combined.

In a similar manner, the periodic function $W(x)$ can be shown to include a number of optical wave fronts. Assume that the periodicity of the desired function is $p$, then the function can be written as:

$$W(x) = \sum_{k=-\infty}^{\infty} C_k e^{ik\frac{2\pi}{p}x} \quad (11)$$

where $$C_k = \frac{1}{p}\int_{-p}^{p} W(x) e^{ik\frac{2\pi}{p}x} dx$$

and is the Fourier expansion coefficient. According to optical theory, the term $$e^{ik\frac{2\pi}{p}x}$$

represents a plane wave front propagated at an angle $$\theta_k = k\lambda/p$$

with respect to the normal of the surface of the hologram 12 and $C_k$ gives the amplitude and phase of each plane wave front. Now by letting $$C_k = t_k e^{i\alpha_k}$$

and $$A_k(x)e^{i\phi_k(x)} = e^{ik\frac{2\pi}{p}x} \quad (12)$$

then equation (11) reduces to equation (8) and the function $W(x)$ can be synthesized by a synthetic hologram of a group of plane waves in a manner analogous to the synthesizing of a square wave of electrical energy by a plurality of sinusoidal waves. Thus, each plane wave can be considered a "harmonic" because they are a harmonic in the Fourier series expansion.

In general, $C_k$ is a complex constant having a definite amplitude and phase angle for the $k$th plane wave. From equation (12), it can be seen that the amplitude of $c_k$ is achieved by varying the exposure time $t_k$, and the phase angle is obtained by inserting phase compensating plates in either the reference beam or the object beam. In practice, however, the phase of the reference beam is usually varied. Synthesizing the function $W(x)$ is difficult if the phase angle of the reference beam must be varied to an arbitrary value when generating a hologram in a two-beam system. However, the term $C_k$ can be resolved into its real and imaginary components such that:

$$C_k = a_k + ib_k = t_k\cos\alpha_k + it_k\sin\alpha_k \quad (13)$$

where $$a_k = t_k\cos\alpha_k$$

and $$b_k = t_k\sin\alpha_k.$$

Now, in order to generate a wave front having a desired phase angle, it is only necessary to synthesize the real and imaginary components of each harmonic separately. However, since both $a_k$ and $b_k$ can be either positive or negative, the reference wave can assume a phase angle of either 0°, 90°, 180°, or 270°. Such angles are relatively easy to achieve as will be described later.

Referring to FIG. 3, there is shown at the upper portion thereof a typical filter function such as $Q(x)$ between the limits $-T/2$ to $T/2$. Since the filter function $Q(x)$ is part of a repeating function, the periodic function $W(x)$ can be used to synthesize the desired function. Assume the triangular wave shown at $a$ of FIG. 3 is a curve defined by the function $W(x)$, then FIG. 3b is a plot of the intensity of the wave front transmitted through a hologram on which such a function is recorded. FIG. 3c is a plot of the phase angle of the reconstructed wave and FIG. 3d shows the amplitude and phase of the harmonics considered necessary to produce the filter function $W(x)$.

For continuous functions with discontinuous derivatives, the Fourier coefficients of the various harmonics are of the order of $1/k^2$, and a synthesis up to the seventh harmonic is usually sufficient for an accurate reproduction of the desired filter function. However, for a discontinuous function with continuous integration, the Fourier coefficients of the series expansion are of the order of $1/k$ and possibly additional harmonics may be necessary.

A simple triangular wave function such as shown in FIG. 3a can be synthesized using only odd harmonics, and it is considered that a total of eight harmonics will provide sufficient accuracy. Each of the eight harmonics are made to interfere with a reference beam in the generation of the hologram 12 at an angle $\theta_k = k\lambda/p$ with respect to the normal as shown in FIG. 4. The object beams 17 and 18 for generating the first harmonic are displaced from the normal by an angle $\theta_1$; the object beams 19 and 21 representing the third harmonic are displaced by an angle $\theta_3$; the fifth harmonic waves 22 and 23 are displaced by an angle $\theta_5$; and the seventh harmonics 24 and 26 are displaced by an angle $\theta_7$.

In the above description and illustration, a one-dimensional filter was explained. Obviously, two-dimensional filters can be generated in a similar manner. Referring to FIG. 1, the function $G(u, v)$ is a two-dimensional filter and the above description can be shown to apply with the following equation:

$$W'(u, v) = \sum_{n,m} C_{nm} e^{ix}\left(\frac{nu}{a} + \frac{mv}{b}\right) \quad (14)$$

replacing equation (11) above.

Referring to FIG. 5, there is shown a system for producing a hologram 12 of a superposition of an aggregation of point sources for synthesizing a filter function to remove the disturbances of the image on the master 10. Holograms have frequently been described as modulated diffraction gratings. In the usual method of formation of a hologram, a diffraction pattern is formed on a photographic plate by the interference of an object wave with a reference wave. The interference pattern on the photographic plate bears no resemblance to any existing object but contains substantially more information than a photograph. To the unaided eye, the interference pattern recorded reveals nothing remotely related to any existing objects. The visible structure of a hologram is purely extraneous and is the result of a somewhat less than perfect light transmitting system.

In FIG. 5, the hologram 12 is produced by multiple exposure of a photographic plate for each harmonic considered necessary to synthesize a desired filter function to produce a clear image on the surface 14. The system includes a laser light source 27 generating a light beam partially reflected by a beam splitter 28 to a reflective surface 29. A light beam reflected from the surface 29 is expanded by a beam expander 31 and collimated by a lens 32. The collimated light from the lens 32 passes through a quarter-wave plate 33 and a half-wave plate 34 arranged in cascade. These plates have two perpendicular axes, a fast axis and a slow axis, and subject a light beam passing through to different amounts of phase retardation depending on the alignment of the two axes with the plane of polarization of the light. The slow axis imparts less phase retardation to a linearly polarized light beam than the fast axis. For the quarter-wave plate 33 ($\lambda/4$ plate), the difference in phase retardation between its two axes is one-quarter of a wavelength or, in mathematical terms, a phase retardation of 90°. For the half-wave plate 34 ($\lambda/2$ plate) the difference in phase retardation is one-half of a wavelength, or a phase angle of 180°.

Thus, with the quarter-wave plate 33 in the reference beam, a 90° phase shift can be introduced by rotating the plate from a position where the slow axis is aligned with the plane of polarization to a position where the fast axis is in alignment with the polarization plane. With the half-wave plate 34 and the quarter-wave plate 33 cascaded, phase shifts of 0°, 90°, and 270° can be achieved by rotating each plate to have either its fast or slow axis aligned with the plane of polarization of the light beam from the source 27. The combinations listed in the following table have been shown to be adequate to synthesize the real and imaginary parts of $C_k$.

| PLATE AXIS ORIENTATION | | | | |
|---|---|---|---|---|
| Plate 33 | Slow | Fast | Slow | Fast |
| Plate 34 | do | Slow | Fast | Do |
| Phase angle | 0° | 90° | 180° | 270° |

The collimated light from the lens 32 is identified as the reference beam for generating an interference pattern on a photographic plate 36. Light passing through the beam splitter 28 is transmitted to the reflective surface 37 and reflected therefrom to a beam expander 38. Light waves from the expander 38 are collimated by a lens 39 and reflected to the photographic plate 36 by means of an adjustable reflective surface 41. The light beam from the reflective surface 41 is the object wave that interferes with the reference wave collimated by the lens 32.

In operation, the photographic plate 36 is exposed once for each harmonic used to produce the desired filter function. For each harmonic, the reference wave is maintained constant and the angle of propagation of the object wave with respect to the normal of the plane of the photographic plate 36 varies by means of the adjustable reflective surface 41. Although the angle of incidence on the photographic plate 36 remains constant for the reference wave, the orientation of the quarter-wave plate 33 and the half-wave plate 34 is varied for each harmonic to synthesize the real and imaginary component set forth in equation (13). Remarkably good image resolution is possible by the system of FIG. 1 when using a hologram produced by the system of FIG. 5.

Using the system of FIG. 5, a synthetic hologram was generated for the triangular wave function of FIG. 3a. Since the triangular wave is continuous, synthesis up to the seventh harmonic was considered adequate. The following table gives the values of the various parameters for each of the eight harmonics.

| Harmonic (k) | −7 | −5 | −3 | −1 | 1 | 3 | 5 | 7 |
|---|---|---|---|---|---|---|---|---|
| Amplitude (1/k²) | 1/49 | 1/25 | 1/9 | 1 | 1 | 1/9 | 1/25 | 1/49 |
| Phase (θ) | 0° | 180° | 0° | 180° | 0° | 180° | 0° | 180° |
| Exposure (sec.) (t) | 0.16 | 0.32 | 0.88 | 7.9 | 7.9 | 0.88 | 0.32 | 0.16 |

Exposure times are based on the use of a Kodac (TM) 649F photographic plate and a 15 mw. He-Ne laser. Although the laser generated a spherical wave front, a plane wave front at the plate 36 was approximated with sufficient accuracy by locating the laser 27 about 84 inches from the plate. A filter approximately 1¼ inches was generated. The increase in the angle $\theta_k$ between each harmonic was on the order of 7 seconds.

While only one embodiment of the invention, together with modifications thereof, has been described herein and shown in the accompanying drawings, it will be evident that various further modifications are possible in the arrangement and construction of its components without departing from the scope of the invention.

I claim:

1. A system for generating a spatial filter by synthesizing a filter function with a plurality of interference patterns on an energy sensitive surface, comprising:
    means for generating an object beam;
    means for generating a reference beam to form the interference patterns with said object beam on said energy sensitive surface;
    electrooptic means for controlling the phase angle of one of said beams, said means comprising a quarter-wave plate in association with a half-wave plate;
    means for varying the angle of incidence between said beams at said energy sensitive surface; and
    means for varying the intensity of said object beam for each interference pattern between said beams.

2. Apparatus for generating a spatial filter by synthesizing a representative filter function with a plurality of interference patterns on a photosensitive surface, comprising:
    means for generating a beam of monochromatic polarized light;
    a beam splitter for dividing said beam into an object wave and a reference wave;
    means for directing said object wave to impinge on said photosensitive surface;

means for directing said reference wave to impinge on said photosensitive surface to form the interference patterns with said object wave on said surface;

means for varying the phase angle of one of said waves, said means comprising a quarter-wave plate and a half-wave plate positioned in said reference wave;

means for varying the angle of incidence between said waves at said photosensitive surface; and means for varying the exposure time of said photosensitive surface for each interference pattern between said waves.

3. Apparatus for generating a spatial filter as set forth in claim 2 wherein said means for directing said object wave is a reflective surface and said means for varying the angle of incidence is coupled to said reflective surface for controlling the position thereof.

4. A method of generating a preselected complex spatial filter by synthesizing a predetermined filter function with a plurality of interference patterns on an energy sensitive surface comprising:

generating sequentially a plurality of interference patterns between two plane waves from separate energy beams, discrete ones of said plurality of interference patterns corresponding to respective harmonics of said predetermined filter function; and exposing said energy sensitive surface to record each of said plurality of interference patterns to produce a multiple exposure hologram which synthesizes a preselected complex filter function.

5. A method of generating a preselected complex spatial filter by synthesizing a predetermined filter function with a plurality of interference patterns recorded on a light sensitive surface comprising:

generating an object beam to impinge on said light sensitive surface;

generating a reference beam to impinge on said light sensitive surface to form the interference patterns thereon with said object beam;

forming a plurality of discrete interference patterns, respectively corresponding to harmonics of said predetermined filter function, by varying the angle of incidence said object makes with said light sensitive surface and by varying the phase angle of said reference beam prior to impinging on said light sensitive surface; and exposing said light sensitive surface once for each interference pattern between said beams to record the interference pattern corresponding to one of said harmonics thereby to form a multiple exposure hologram that synthesizes a preselected complex spatial filter function.

6. A method of generating a spatial filter as set forth in claim 5 including varying the exposure time for each interference pattern recorded on said light sensitive surface.